United States Patent [19]
Essafi et al.

[11] Patent Number: 5,862,397
[45] Date of Patent: Jan. 19, 1999

[54] ARRAY SYSTEM ARCHITECTURE OF MULTIPLE PARALLEL STRUCTURE PROCESSORS

[75] Inventors: Hassane Essafi, Orsay; Dominique D'Humieres, Paris; Marc Pic, Lauris, all of France

[73] Assignee: Commissariat a l'Energie Atomique, Paris, France

[21] Appl. No.: 761,757

[22] Filed: Dec. 5, 1996

[30] Foreign Application Priority Data

Dec. 19, 1995 [FR] France .................................. 95 15049

[51] Int. Cl.⁶ ............................. G06F 13/40; H04L 12/42
[52] U.S. Cl. ................................ 395/800.22; 395/800.15; 370/224
[58] Field of Search ....................................... 395/711, 149, 395/800.11, 200.44, 182.02, 800.22, 800.29, 800.1, 800.16, 800.12, 800.32; 364/706.41, DIG. 1, DIG. 2; 370/224, 377, 366; 702/57; 711/106, 167, 122

[56] References Cited

U.S. PATENT DOCUMENTS

| | | | |
|---|---|---|---|
| 4,709,365 | 11/1987 | Beale et al. ......................... | 395/182.02 |
| 4,942,517 | 7/1990 | Cok ..................................... | 395/800.11 |
| 5,504,918 | 4/1996 | Collette et al. ..................... | 364/DIG. 1 |
| 5,574,931 | 11/1996 | Collette et al. ..................... | 395/800.11 |

FOREIGN PATENT DOCUMENTS 0 646 875   4/1995   European Pat. Off. .

OTHER PUBLICATIONS

IEEE, vol. 1, pp. 372–375, 1994, Neil R. S. Simons, et al., "Cellular Automata as a New Computational Approach to Modelling Electromagnetic Phenomena".

*Primary Examiner*—Daniel H. Pan
*Attorney, Agent, or Firm*—Oblon, Spivak, McClelland, Maier & Neustadt, P. C.

[57] ABSTRACT

A system of elementary processors in array form organized in accordance with a plurality of nodes with SIMD operation, each having a plurality of elementary processors connected to one another so as to form a ring of elementary processors, each elementary processor being associated with a connection cell connected to the cells of neighbouring elementary processors in order to form a ring network. Each SIMD node is provided with a memory and addressing module ensuring an addressing independence of the node, as well as a control unit connected to the control units of neighbouring nodes in order to form an internode control network in which priority tokens circulate, each memory and addressing module of a node being connected to the memory and addressing module of neighbouring nodes so as to form an internode data network. The system may find one application in the simulation of fluid flows.

12 Claims, 3 Drawing Sheets

ARRAY SYSTEM ARCHITECTURE OF MULTIPLE PARALLEL STRUCTURE PROCESSORS

BACKGROUND OF THE INVENTION

1. Field of the Invention

The invention relates to an array system architecture of processors having multiple parallel structures which in particular is suitable for the digital simulation of fluid flows.

The invention has applications in the field of data processing, particularly for data relative to fluid flows (water, air, gas, molten metals, etc.). It can e.g. be used in geology for studying the behaviour of porous media, the strength of materials for the study of the resistance of parts to fluid flows, in aerodynamics for atmospheric reentry problems, in chemistry for the study of catalytic phenomena, or finally metallurgy for the study and design of liquefied metal filtering means, etc.

2. Discussion of the Background

In the data processing field, it is often necessary to process inhomogeneous data structures, i.e. structures having on an overall basis identical behaviours, but whose local behaviours may differ. This is in particular the case for data relative to fluid flows, which generally have identical macroscopic behaviours, but which are dependent on the microscopic behaviours of the constituents of the fluid.

For studying the macroscopic behaviour of fluids, it is known to carry out a modelling thereof. This is done by discretizing the physical space into a two or three-dimensional network with unity spacing, in which each constituent molecule of the fluid is modelled by a point moving on a grid of discrete positions, i.e. the network. Each site of the network, i.e. each point of the grid, corresponds to a local value of several fields representing physical quantities, such as the particle density, flow, etc.

The time is also discretized for such a modelling. For each time interval, each site evolves following a law simulating the physical behaviour of the flow in question using the values taken by the fields in the vicinity thereof.

This evolution of the sites can be carried out in different ways. Conventionally it takes place by means of laws expressed in the form of partial differential equations, such as NAVIER-STOCKES equations, by means of a method of finite elements or finite differences.

This evolution can also be carried out by so-called gas-on-network methods consisting of simulating the macroscopic behaviour of the fluid by means of a mesoscopic space provided with "automaton-type" evolution laws, determined in such a way as to correspond to partial differential equations, such as NAVIER-STOCKES equations. This gas-on-network method consequently makes it possible to model on a microscopic scale the behaviour of a fluid seeking the similarity between the macroscopic behaviour of the gas and that of a real fluid.

Compared with conventional methods, these gas-on-network methods have the advantage of permitting much more varied applications as a result of the considerable adaptability capacity of the rules used in these methods for modelling various physical systems.

In gas-on-network methods, the propagation on the links of the network takes place at the speed of one network spacing per time unit. This propagation is synchronized, so that for each time interval all the particles having a non-zero speed are simultaneously displaced. This propagation phase is followed by a collision phase on each site, i.e. on each point of the grid or network. For this method, the collision rules consist of associating with each possible configuration representing an entry state of the particles on the site, another configuration which will represent the outlet state produced by the collision of the particles on this site. This simulation of the behaviour of the fluid is governed by collision rules differing as a function of the chosen model.

In gas-on-network methods, it is e.g. possible to use Boolean models. In this case, the collision rules used operate solely on binary variables and are in the form of collision tables representing all the possible cases. Thus, these collision tables summarize the evolution function of the system, which takes account of quantities retained in the studied system, such as the movement quantity and mass.

Such a Boolean gas-on-network method is generally performed by architectures of parallel structure processor systems performing a simultaneous processing on a large number of sites. It is known to install accelerating cards on working stations such as the CAM machines described by T. TOFFOLI and M. MARGOLUS in "Cellular Automa Machines", MIT Press, Cambridge, Mass., 1987, or the R.A.P. machines described by A. CLOUQUEUR and D. D'HUMIERES "R.A.P.: a family of cellular automaton machines for fluid dynamics", in Proceedings of the 12th Gwatt workshop on complex systems, Gwatt, Switzerland, October 1988.

This Boolean model gas-on-network method is easy to perform as a result of the use of collision tables. It is therefore fast and can be adapted to problems of different types. Moreover, the operations are carried out without information loss, so that said method is digitally stable. However, this method suffers from a major disadvantage with respect to the presence of digital noise found on the results obtained at the end of processing and the digital noise can disturb the extraction of the results.

The gas-on-network method can also use BOLTZMANN models. In this case, the collision rule consists of a local resolution of an equation of state. Contrary to the collision rules with respect to Boolean models, this collision rule based on BOLTZMANN models uses variables having real values representing particle distributions. Thus, this makes it necessary to carry out floating calculations, whose performance is difficult and burdensome. This method also requires the resolution of partial differential equations, which is also burdensome to perform. Moreover, this method permits a good precision of the calculations, due to the quasi-continuous aspect of the particle distributions forming said model, which ensures a reduced digital noise, but said calculations are not very stable.

SUMMARY OF THE INVENTION

The object of the invention is to obviate these disadvantages. To this end it proposes an array-type elementary processor system architecture, permitting the implementation of a Boolean model gas-on-network method, whose results do not suffer from digital noise.

Therefore this architecture makes it possible to process data relative to the digital simulation of fluid flows. More generally, it makes it possible to process different inhomogeneous data types.

More specifically, the invention relates to an array-type elementary processor system, organized according to a plurality of SIMD operation nodes, each having a plurality of elementary processors connected to one another so as to form a ring of elementary processors, each elementary processor being associated on the one hand with a memory and on the other with an interconnection module, the latter having a connection cell connected to the cells of neighbouring elementary processors in order to form a ring network in which circulate priority tokens, a message reception module connected between the connection module and the elementary processor and a message transmission module connected between the elementary processor and the connection cell.

This array-type elementary processor system is characterized in that each elementary processor of each node is provided with a local memory manager ensuring the addressing independence thereof with respect to other elementary processors and in that each SIMD node is provided with a control unit connected to the control units of neighbouring nodes in order to form an internode control network in which circulate the priority tokens.

Advantageously, each SIMD node is provided with a memory and addressing module ensuring an addressing independent of the node, each memory and addressing module of a SIMD node being connected to the memory and addressing module of neighbouring SIMD nodes, so as to form an internode data network.

In its application to the digital simulation of fluid flows, the array-type elementary processor system has breaking down means for breaking down a multiple fluid particle collision into a plurality of elementary Boolean collisions which can be processed as from the SIMD nodes.

Advantageously, said breaking down means incorporate maximum/minimum extraction means, pseudorandom drawing means, as well as means for automating the elementary collision breakdown.

According to this application to the digital simulation of fluid flows, each elementary processor can also have reconfiguration means for reconstructing, from the processed elementary collisions, a resultant collision.

DESCRIPTION OF THE PREFERRED EMBODIMENTS

Figure 1:
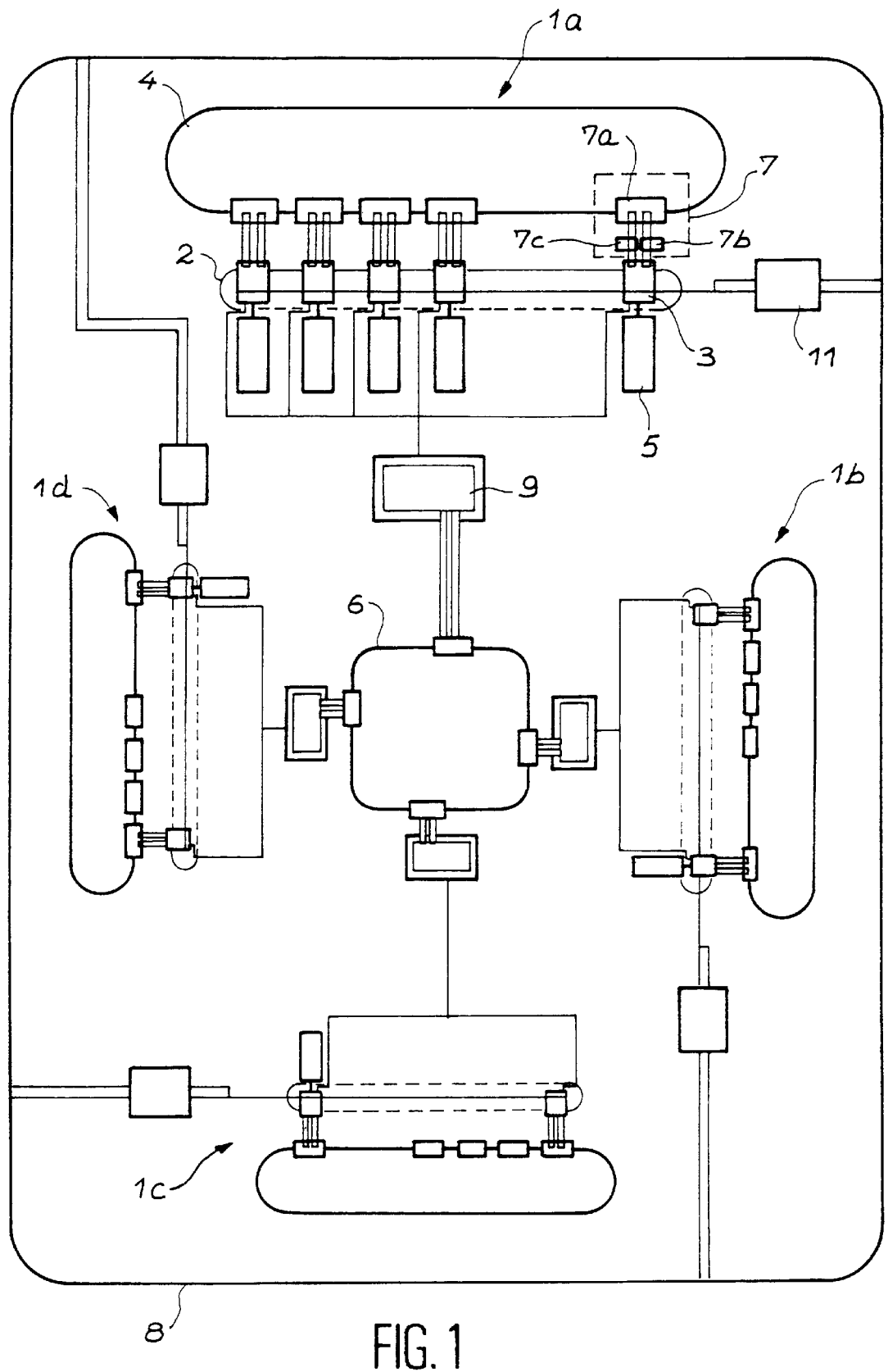
FIG. 1 diagrammatically shows the architecture of the array-type elementary processor system according to the invention.

The invention relates to an array-type system architecture of multiple parallel structure elementary processors and which is diagrammatically shown in FIG. 1. In FIG. 1 the system of the invention is constituted by a plurality of nodes 1 having SMID operation (Single Instruction Multiple Data Stream).

In the example of FIG. 1, the system is constituted by four SIMD nodes 1a, 1b, 1c and 1d, all of which are strictly identical. Therefore only one of these nodes will be described in order to simplify the description. A description will be given of node 1a.

The node 1a has a plurality of elementary processors 3 connected to one another so as to form a first ring 2 referred to as the elementary processor ring. Each elementary processor 3 is provided with a local memory manager LMM ensuring the addressing independence thereof with respect to other elementary processors. In other words, this LMM is a device using the memory organization principles (helical organization) described in FR-A-2 623 310 (p 7, line 10 to p 10, line 35). Each elementary processor 3 of this SIMD node 1a is associated with on the one hand its own memory 5 and on the other with an interconnection module 7. This interconnection module has a connection cell 7a connected to the connection cells of neighbouring elementary processors so as to form a second ring 4, referred to as the ring network, in which circulate priority tokens.

Thus, when a token is present, the connection cell 7a ensures the reception of the first data item of the message flowing in the network 4 and intended for the elementary processor 3 with which the connection cell 7a is associated. The connection cell 7a also ensures the transmission of the message which the elementary processor 3 wishes to send to the network 4.

This interconnection module also has a message reception module 7b connected between the connection cell 7a and the elementary processor 3 and which ensures the storage of complete messages received by the connection cell 7a and intended for the elementary processor 3 with which the reception module b is associated.

The interconnection module also has a transmission module 7c connected between the elementary processor 3 and the connection cell 7a and ensuring the storage of complete messages which the elementary processor 3 wishes to send to the network 4.

This part of the SIMD processor system will not be described in greater detail, because it is already known to the expert. Thus, such a parallel structure elementary processor system is described in FR-A-2 680 026 and FR-A-2 623 310, which describe a processor array-type system architecture, in which the processors are interconnected to form a ring. Moreover, FR-A-2 710 993 describes the interconnection module associated with each processor of the ring. It also describes the management process for the messages flowing in the parallel structure processor network of the type described in the two preceding documents.

The SIMD node 1a also has a control unit (UC) 9 connected to the control units of neighbouring SIMD nodes 1b, 1d. Interconnected in this way, the control units 9 of each of the nodes of the system form a third ring 6, known as the internode control network.

The SIMD node 1a also has an addressing and memory module 11 giving an addressing independence to the node. This addressing and memory module 11 is also connected to the addressing and memory module of adjacent nodes 1b, 1d, so as to form a fourth ring 8 known as the internode data network.

Thus, all the SIMD nodes 1a–1d of the structure are interconnected in two different ways and thus form two communications networks 6 and 8, which act at different processing levels.

Thus, the internode control network 6, i.e. the ring linking together the control units, ensures the transfer of informations for the control of the performance and synchronization of the tasks performed by each of the nodes 1a–1d.

The internode data network 8, i.e. the network connecting each group of elementary processors to one another, ensures the transfer of massive data blocks, not point by point as in the other networks 2, 4 and 6, but instead in a global manner, namely from node to node.

Thus, each node acts independently of the neighbouring node following a program loaded into its control unit, whereas within each of the nodes, the elementary processors connected by the ring 2 act simultaneously performing an identical program governed by the central unit associated therewith.

In other words, the fact that the control units are linked in the form of a network 6 makes it possible to process inhomogeneous data structures, because within each SIMD node, the elementary processors operate in parallel with the others, but each node can operate independently of the other nodes.

It should also be noted that the management of the internode control network 6 is identical to that of the second ring 4. Thus, the management takes place by means of a priority token circulating within the network and as explained in FR-A-2 710 993.

The internode data network 8 has a completely different function to the internode control network 6. Thus, the internode data network 8 makes it possible to process data relative to the boundaries between two data areas to be processed by the SIMD nodes. These problem areas are in general the contours of solid objects, the particle injection areas or phases in multi-phase media, etc.

With conventional parallel SIMD architectures, during the processing of two areas of the simulation space, which have a different behaviour, the processors processing one of these two areas must be inhibited, so as to wait for those processors processing the other area to complete their processing operation, the functions then being reversed. This processing of the borders between two areas, also known as edge processing, is solved by the fact that the network 8 transfers massive data blocks from one node to a second node, which leads to a simplification of the processing within each node. This border problem is solved in the invention by taking the ratio of the number of nodes to the total number of elementary processors and keeping the ratio as small as possible in order to reduce circuitry and therefore architecture costs. Therefore this border processing leads to an improvement in the operating speed of the complete system and limits its cost.

For information purposes, it is pointed out that the architecture of the invention can have two to approximately thirty two nodes as a function of the processing to be carried out, i.e. a repetitive processing requiring a small number of nodes, whereas more complex processing (such as atmospheric reentry problems) requires a large number of nodes. Moreover, each node has a number of processors variable as a function of the processing to be carried out and typically a node has thirty two to one thousand and twenty four elementary processors.

Thus, this multiple parallel structure processor system can be used for numerous data types and in particular for the digital simulation of fluid flows.

In the particular case of the digital simulation of the flow of a fluid, the processor system according to the invention makes it possible to process the collisions of the particles at a site, which constitutes the microscopic behaviour of the fluid.

Certain collisions between particles can be processed in a very simple manner, particularly the collisions between two particles arriving face to face at the site, or between three particles arriving symmetrically with respect to one another at the site.

Figure 2:
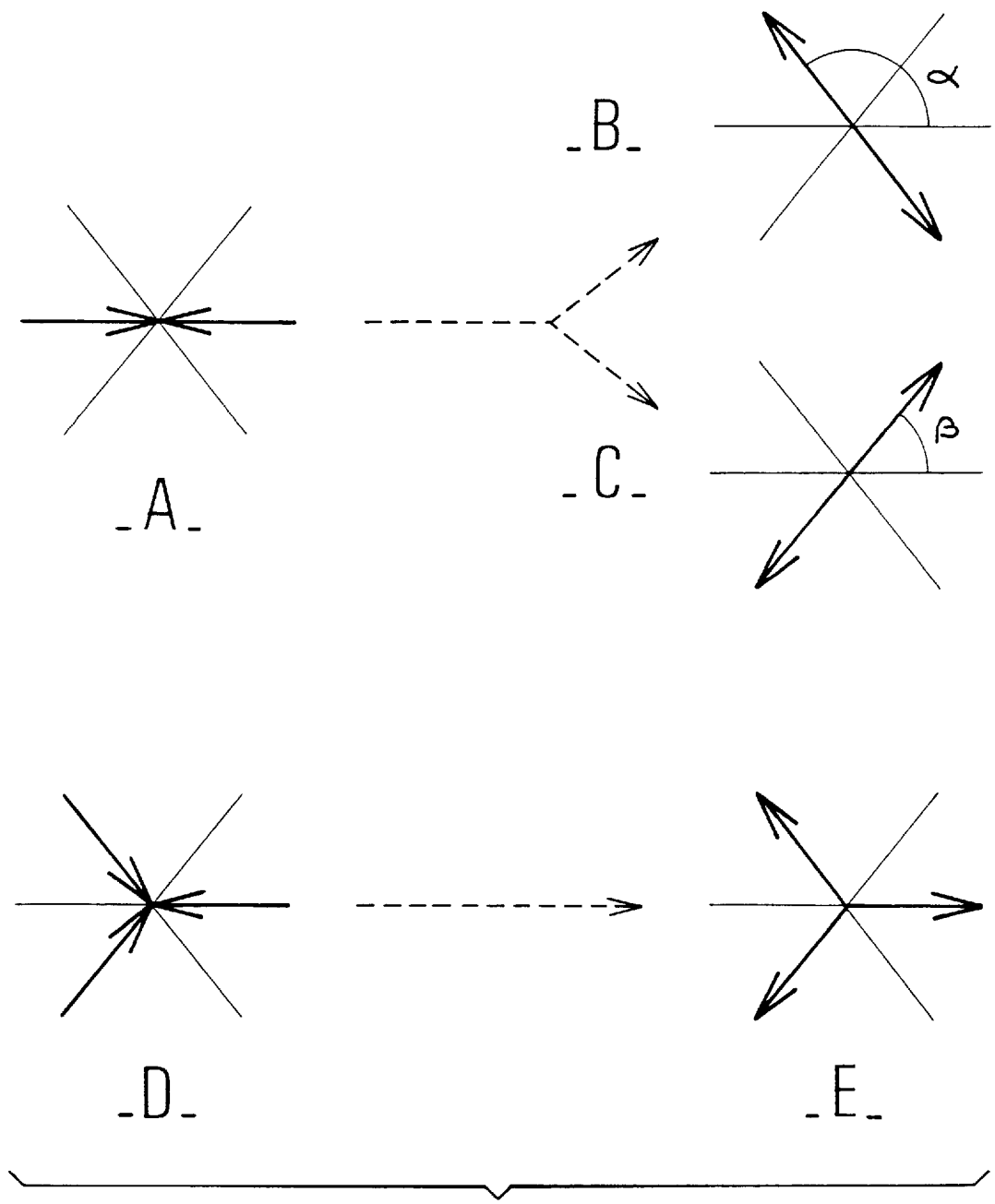
FIG. 2 shows examples of simple collisions between particles, as well as the result of such collisions.

FIG. 2 shows two examples of collisions between particles. Part A of FIG. 2 shows an example of a collision between two particles arriving face to face at the site. Parts B and C of FIG. 2 show the two resultant collisions which can be obtained as a result of the collision. More specifically, the resultant collision can consist of the two particles, following the collision, in each case being distributed with an angle $\alpha$ with respect to their arrival direction, as shown at B, or with an angle $\beta$, as shown at C. In the example of FIG. 2, $\alpha$ is approximately equal to 120° and $\beta$ approximately 60°.

FIG. 2 also shows a second example of a collision, namely a collision D between three particles arriving at the site in mutually symmetrical directions, i.e. directions forming an angle of 120° with the other directions. The result of this collision, shown at E, is that each particle, after the collision, is distributed in the same direction as its arrival direction, but in the reverse sense.

However, as the expert knows, most collisions between particles are much more complex than those shown in FIG. 2. For this purpose, the invention proposes means making it possible to break down the complex collisions, i.e. multiple collisions, into a plurality of elementary collisions and then to reconstruct the resultant collision obtained after the particles in question have collided.

For this purpose, each elementary processor a SIMD node, intended to simulate the behaviour of particles on at least one network site, is equipped with means for breaking down multiple collisions. These breaking down means 12 have separating means, maximum/minimum extraction means and pseudorandom drawing means.

These means will be described in more detailed manner hereinafter.

Figure 3:
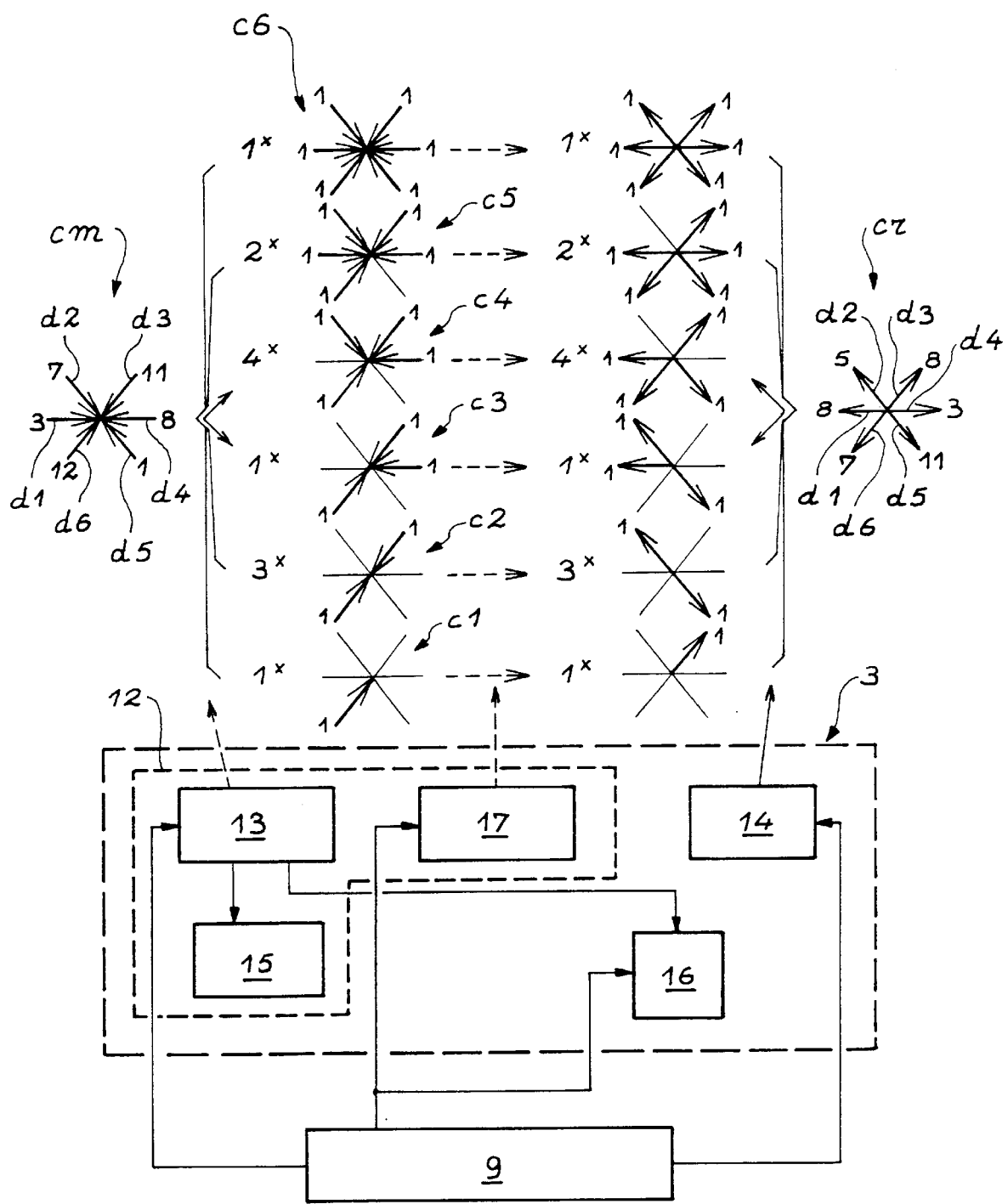
FIG. 3 is an operating diagram showing the different interventions of the breaking down means of an elementary processor on the example of the breakdown of a multiple collision.

FIG. 3 shows an example of the breaking down of a multiple collision. It is an order 6 collision (i.e. in 6 different directions) between 42 particles. The six particle arrival directions are designated d1 to d6. The figures at the end of each arrow represent the number of particles arriving in each direction. Thus, it can be seen that three particles arrive in direction d1, seven particles arrive in direction d2, eleven particles in direction d3, eight particles in direction d4, one particle in direction d5 and twelve particles in direction d6.

The process for breaking down this multiple collision consists of using an integral value distributing model within which there is a breakdown, in successive levels, of multiple Boolean collisions as a function of the maximum number of particles involved. Thus, in the case shown in FIG. 3 of a multiple collision cm with six speed vectors, the collision is broken down into at the most six successive levels, each corresponding to an integral multiple of an elementary collision.

In the example shown in FIG. 3, the order 6 level C6 is trivial, because there is one particle on each direction d1 to d6 and the order 6 level appears once. The elementary collision C5 of the order 5 level appears twice, because there are at the most two particles on each of the directions d1, d2, d3, d4 and d6. The order 4 elementary collision C4 appears four times, because there are at the most four particles on each of the directions d2, d3, d4 and d6. The order 3 elementary collision C3 has a single elementary collision where one particle appears on each of the directions d3, d4 and d6. The order 2 elementary collision C2 appears three times, because there are at the most three particles arriving in each of the directions d3 and 6. The order 1 elementary collision C1, i.e. the last order level, is a single elementary collision on which a single particle arrives in direction d6.

Each of the collisions C1 to C6 is then separately resolved following the previously chosen Boolean model. The Boolean solution of each elementary collision is then multiplied by the number of corresponding appearances or weight.

When the weighting operation is ended, all the results are summated, so as to obtain the final state of the collision, which is called the resultant collision cr. The thus obtained resultant collision cr has eight particles distributed over direction d1, five particles over direction d2, eight particles over direction d3, three particles over direction d4, eleven particles over direction d5 and seven particles over direction d6.

To carry out this breakdown/reconstruction processing of the collision, each elementary processor for simulating the behaviour of one network site has breaking down means 12 and reconstruction or reconfiguration means 14.

Thus, the breaking down means have separation means 13 for automating the elementary collisions of the multiple collisions, maximum/minimum extraction operating means 15 and pseudorandom drawing means 17 necessary at the initialization phases and collisions of the process. These different means are shown in FIG. 3 relative to the different stages of the breakdown of the multiple collision cm, the instants during the process during which these different means intervene being symbolized by dotted line arrows.

The data relative to the distributions of the particles to be processed, stored in the memory of UC 9, are supplied to the separation means 13 ensuring the management of the processing of these distributions. These separation means 13, which will be described in greater detail hereinafter, are connected to maximum/minimum extraction means 15 aiding in the breaking down of the multiple collision cm into elementary collisions C1 to C6.

These maximum/minimum extraction means at least partly obtain freedom from the parallel processing, i.e. they ensure a certain independence of the data processing so as to avoid any time loss, in the case where one of the elementary processors has finished its processing before the other elementary processors.

The pseudorandom drawing means 17 are used when there are multiple collisions, such as the collision A shown in FIG. 2, which can give rise to several different results. These pseudorandom drawing means 17 are also useful during the processing initialization phases for choosing the processing order of the distributions in the memory.

The separation means also ensure the successive entry in the memory of Boolean particle distributions, so as to permit an optimum SIMD operation for areas using identical collision rules.

Thus, a processor processes several sites sequentially during the same collision phase. Thus, on two sites processed by two different processors, the Boolean distribution breakdown may not involve the same number of cycles. The zero distribution (i.e. the final distribution when all the elementary collisions have been found) can consequently be reached in less stages on one of the sites than on the other. In this case a time loss would appear to be generated by the wait of the longest processor. In fact, the separation means 13 manage the reading of data from neighbouring processors and a contiguous memory storage of the Boolean distributions, so as to ensure the possibility of a time overlap of the processing of two different sites. The processor which has most rapidly finished its processing of a site will therefore start to process a following site.

It should be noted that the processing is entirely identical, no matter which site it applies to. There is only a change of the address checked or entered in the memory for the reading of the entry distribution and the address checked or entered in the memory for writing the exit distribution. However, the total processing time of two equal groups of sites by two different processors takes place in an equivalent time.

In this application to the digital simulation of fluid flows, each elementary processor also has reconfiguration means 14 for reconstituting the resultant collision cr, after each elementary collision C1 to C6 has been processed. These means consist of a summation of all the results obtained for each of the elementary collisions after being multipled by the weight or significance allocated thereto.

The processing process of data relative to the collisions of particles implemented by the array-type system architecture of processors described hereinbefore makes it possible to obtain a good calculation precision with a relatively inexpensive circuitry, because no floating calculation is required. Moreover, the efficiency of the discretization of the particle states makes it possible to obtain results with a very low and therefore non-prejudicial digital noise. Moreover, through the use of Boolean collision rules there is a good calculation stability.

We claim:

1. An array-type processor system organized with a plurality of SIMD operation nodes, each SIMD operation node having a plurality of elementary processors connected to one another so as to form a ring of elementary processors, each elementary processor being associated with a memory and with an interconnection module, each interconnection module having a connection cell connected to connection cells of neighboring elementary processors in order to form a ring network in which priority tokens circulate, a message reception module connected between the connection cell and a respective elementary processor and a transmission module connected between the respective elementary processor and the connection cell, wherein each elementary processor of each SIMD operation node is provided with a local memory manager ensuring an addressing independence of the local memory manager with respect to the other elementary processors, and wherein each SIMD operation node is provided with a control unit connected to control units of neighboring SIMD operation nodes in order to form an internode control network in which the priority tokens circulate, and each SIMD operation node is provided with a memory and addressing module ensuring an addressing independence of the SIMD operation node and each memory and addressing module of a respective SIMD operation node is connected to the memory and addressing module of neighboring SIMD operation nodes so as to form an internode data network.

2. An array-type processor system for a digital simulation of fluid flows organized with a plurality of SIMD operation nodes, each SIMD operation node having a plurality of elementary processors connected to one another so as to form a ring of elementary processors, each elementary processor being associated with a memory and with an interconnection module, each interconnection module having a connection cell connected to connection cells of neighboring elementary processors in order to form a ring network in which priority tokens circulate, a message reception module connected between the connection cell and a respective elementary processor and a transmission module connected between the respective elementary processor and the connection cell, wherein each elementary processor of each SIMD operation node is provided with a local memory manager ensuring an addressing independence of the local memory manager with respect to the other elementary processors and wherein each SIMD operation node is provided with a control unit connected to the control units of neighboring SIMD operation nodes in order to form an internode control network in which the priority tokens circulate, and further including breaking down means for breaking down a multiple fluid particle collision into a plurality of elementary Boolean collisions which can be processed on the basis of the SIMD operation nodes.

3. The array-type processor system according to claim 2, wherein the breaking down means have maximum/minimum extraction means, pseudo-random drawing means and elementary collision separation means.

4. The array-type processor system according to claim 2, wherein each elementary processor also includes reconfiguration means for reconstituting a resultant collision on the basis of processed elementary collisions.

5. An array-type elementary processor system organized with a plurality of SIMD operation nodes, each SIMD operation node having a plurality of elementary processors connected to form a ring of elementary processors, each elementary processor being associated with a memory and with an interconnection module, each interconnection module including a connection cell connected to connection cells of neighboring elementary processors to form a ring network in which priority tokens circulate, a message reception module connected between the connection cell and a respective elementary processor and a transmission module connected between the respective elementary processor and the connection cell; wherein each elementary processor of each SIMD operation node includes a local memory manager for an addressing independence of the local memory manager with respect to the other elementary processors;

each SIMD operation node includes a control unit connected to control units of neighboring SIMD operation nodes to form an internode control network in which the priority tokens circulate; and each SIMD operation node further includes a memory and addressing module for an addressing independence of each SIMD operation node, and each memory and addressing module of a respective SIMD operation node is connected to the memory and addressing module of neighboring SIMD operation nodes to form an internode data network.

6. An array-type processor system for a digital simulation of fluid flows organized with a plurality of SIMD operation nodes, each SIMD operation node having a plurality of elementary processors connected to form a ring of elementary processors, each elementary processor being associated with a memory and with an interconnection module, each interconnection module including a connection cell connected to connection cells of neighboring elementary processors to form a ring network in which priority tokens circulate, a message reception module connected between the connection cell and a respective elementary processor, and a transmission module connected between the respective elementary processor and the connection cell, wherein each elementary processor of each SIMD operation node includes a local memory manager for an addressing independence of the local memory manager with respect to the other elementary processors;

each SIMD operation node includes a control unit connected to control units of neighboring SIMD operation nodes to form an internode control network in which the priority tokens circulate; and further including breaking down means for breaking down a multiple fluid particle collision into a plurality of elementary Boolean collisions processed on the basis of the SIMD operation nodes.

7. The array-type processor system according to claim 6, wherein the breaking down means have maximum/minimum extraction means, pseudo-random drawing means and elementary collision separation means.

8. The array-type processor system according to claim 6, wherein each elementary processor further includes reconfiguration means for reconstituting a resultant collision on the basis of processed elementary collisions.

9. An array-type elementary processor system comprising:

a plurality of SIMD operation nodes, each SIMD operation node including:

a plurality of elementary processors connected to form a ring of elementary processors, each elementary processor being associated with a memory and with an interconnection module, each interconnection module having a connection cell connected to connection cells of neighboring elementary processors to form a ring network in which priority tokens circulate, a message reception module connected between the connection cell and a respective elementary processor, and a transmission module connected between the respective elementary processor and the connection cell, wherein each elementary processor of each SIMD operation node includes a local memory manager for an addressing independence of the local memory manager with respect to the other elementary processors;

a control unit connected to control units of neighboring nodes to form an internode control network in which the priority tokens circulate; and a memory and addressing module for an addressing independence of each SIMD operation node, and each memory and addressing module of a respective SIMD operation node is connected to the memory and addressing module of neighboring SIMD operation nodes to form an internode data network.

10. An array-type elementary processor system for a digital simulation of fluid flows comprising:

a plurality of SIMD operation nodes, each SIMD operation node including:

plurality of elementary processors connected to form a ring of elementary processors, each elementary processor being associated with a memory and with an interconnection module, each interconnection module having a connection cell connected to connection cells of neighboring elementary processors to form a ring network in which priority tokens circulate, a message reception module connected between the connection cell and a respective elementary processor, and a transmission module connected between the respective elementary processor and the connection cell, wherein elementary operation node includes a local memory manager for an addressing independence of the local memory manager with respect to the other elementary processors; and a control unit connected to control units of neighboring nodes to form an internode control network in which the priority tokens circulate;

breaking down means for breaking down a multiple fluid particle collision into a plurality of elementary Boolean collisions processed on the basis of the SIMD operation nodes.

11. The array-type processor system according to claim 10, wherein the breaking down means have maximum/minimum extraction means, pseudo-random drawing means and elementary collision separation means.

12. The array-type processor system according to claim 10, wherein each elementary processor further includes reconfiguration means for reconstituting a resultant collision on the basis of processed elementary collisions.

* * * * *